United States Patent Office 3,278,416
Patented Oct. 11, 1966

3,278,416
HYDROCARBON CONVERSION WITH
SUPERACTIVE CATALYSTS
Francis G. Dwyer, Cherry Hill, and Sylvander C. Eastwood, Woodbury, N.J., assignors to Mobil Oil Corporation, a corporation of New York
No Drawing. Filed Nov. 13, 1962, Ser. No. 237,290
4 Claims. (Cl. 208—87)

This invention relates to the conversion of hydrocarbons by contact with new catalyst composites and more particularly to methods of catalytic conversion of charge hydrocarbons utilizing a catalyst of superactive aluminosilicate dispersed in a solid porous matrix of substantially lesser activity than said aluminosilicate.

The tremendous over-all advancement which resulted from the development of catalytic cracking was found to be so beneficial to the petroleum industry that gigantic installations have been built during the past twenty-five years at a cost running into hundreds of millions of dollars.

Like so many advancements in the scientific field, catalytic cracking had not only its many economic advantages, but it also posed many problems, some of which have withstood constant attacks and have been recognized and accommodated in the commercial cracking systems as ultimately constructed.

One of the problems encountered from the very inception of the catalytic cracking art, and which has defied solution, at least at the origin of the trouble, is that "coke" is formed upon and contaminates the catalysts, thereby inhibiting the effectiveness thereof. "Coke" as formed during the cracking of hydrocarbons is usually considered empirically as carbon, but it is, in the most part, very highly condensed, hydrogen-poor hydrocarbons.

Gas-oil charging stock, as fed to the catalytic cracking systems, has a lesser proportion of hydrogen to carbon than the gasoline and gaseous products produced by the cracking. It follows, therefore, that some material more deficient in the proportion of hydrogen to carbon comes into existence.

The formation of "coke" in the cracking of petroleum represents a very real economic loss. Furthermore, when "coke" is formed and contaminates the catalysts an operational loss occurs since the "coke" must be removed from the catalysts in order for the catalysts to be revitalized.

The normal catalytic cracking systems in use have had to deal with the contamination of the catalyst by the formation of "coke" thereon, and it has been the practice to regenerate the catalyst by burning off the "coke" as a part of a continuous cycle. Regeneration of the catalyst has proven to be an extremely complex procedure, requiring costly equipment. Not only must the "coke" be burned from the catalyst so as to leave it as clean as possible, but since the cracking catalysts are susceptible to damage at temperatures likely to develop during uncontrolled burning, which damage susceptibility is aggravated by the presence of water vapor at high temperatures. Since water vapor arises from the combustion of hydrocarbons deposited upon the catalyst, adequate controlled purging or "stripping" of catalyst must be provided to remove any residual hydrocarbons other than "coke."

The problems involved in the burning off of the "coke" from the catalyst make it necessary to utilize elaborate arrangements to extract heat as formed from the relatively poor heat-transfer catalytic material, and heat transfer coils and the use of large amounts of excess air, or the recirculation of flue gas to dilute the incoming air have been utilized as expedients for this purpose.

In addition to the elaborate arrangements utilized to effect regeneration of the catalysts attention has been directed to the cracking cycle in an effort to avoid build-up of "coke" upon the catalyst in excess of about 2% by weight before regeneration thereof.

To permit the accumulation of more than about 2% of coke upon the catalysts may result in the release of heat so high as to be almost beyond control during regeneration, if the regeneration is conducted within a feasible time limit.

The problem of regenerating the catalyst is in fact so serious that catalytic cracking units now in existence are limited in their operating efficiency and capacity, not by the amount of charge that can be treated in the heater and reactor, but the capacity of the unit is directly restricted to the ability of the system to regenerate the catalyst by the removal of the "coke" therefrom.

Research in the art of the catalytic cracking of petroleum has not only been directed to more efficient means of regeneration of the catalyst, but much work has been done in connection with the improvement of catalysts per se. In this connection, as referred to above, those skilled in the art have been accustomed to expect important but relatively minor advances in the efficiency of catalysts. As distinguished from the type of advances which the art has been accustomed to expect, research with respect to catalysts during the recent past has uncovered a breakthrough totally unexpected and unpredicted which opens up a vast field in which the catalysts included therein have a relative activity of as high as ten thousand times that of the presently used catalysts. In fact, it has been found in the initial investigation of this new catalytic development that the catalysts are so active that they promote an effective barrier against their use in such active conditions in the commercially existing catalytic cracking equipment now in use.

The problems encountered in this over-all development following the production of representative catalysts in this field, having such fantastic and unpredicted activity, have rendered the immediate use of such catalysts impossible on a commercial scale due to the limitations in the present petroleum conversion equipment. While it is contemplated that as the commercial conversion equipment is replaced the designs will be advanced and be capable of making full use of these new catalysts, treatments have been developed to render their use commercially feasible in existing equipment and in existing processes without awaiting further developments in the art. Such treatments involve the reduction of the activity of the catalysts to a level at which they may be immediately utilized with an effectiveness as high as the known equipment and processes may utilize but still at a level much higher than the commercially available catalysts now in use.

As indicated in co-pending patent application Ser. No. 208,512, filed July 9, 1962, now abandoned, new catalysts have now been discovered which have a relative activity of as high as 10,000 times that of presently used catalysts in the cracking of hydrocarbons. Although technology is not now available for achieving full use of these catalysts, it has been found that these materials exhibit product selectivity which is extremely attractive, since the ratio of gasoline yield to coke make in gas oil cracking has been found to be markedly better than that of conventional catalysts.

Product selectivity is a measure of the ability of a conversion process to make wanted product, gasoline, without unduly producing unwanted product, gas coke. It may be expressed as an index. A convenient index may be had by dividing weight percent of coke by volume percent of gasoline produced in the same operation. Care must be taken, however, that comparisons of the coke/gasoline index be made only between operations conducted at about the same level of conversion. Conversion (percent) is defined as feed minus all material (recycle, etc.) effluent from the reaction and boiling above the gasoline made.

One method of reducing the activity of such catalysts is by dilution in a matrix, which matrix has an activity which is far lower than that of the alumino-silicate. Even though the matrix has a relatively low activity, it should be pointed out that the matrix does have a catalytic activity for the same reaction which may be significant, and thus the character of the matrix acts to affect the product selectivity and usefulness of the composite.

Operations with these new composite catalysts have shown very marked advantages in yield and quality of gasoline, in reduced coke formation on the catalyst, and in the character of the individual hydrocarbons in the product stream, particularly in high yields of isobutane necessary for alkylation.

It has now been found essential in using these new composite catalysts that the time on stream when the catalyst is in contact with the charge hydrocarbons must be closely controlled.

It is, therefore, an object of the present invention to provide a novel process for catalytic conversion of hydrocarbons by contact with composite catalysts containing superactive aluminosilicate.

A further objective of the present invention is to provide a novel process for catalytic conversion of hydrocarbons wherein the time on stream is closely controlled so that the reaction is arrested before coke saturation of the active component of the composite catalyst occurs.

It has now been found that best results are obtained in hydrocarbon conversions utilizing this new composite catalyst by arresting the cracking reaction before the catalyst has accomplished the full work of which it is capable. This seemingly anomalous conclusion leads to operations incurring expense for transport and regeneration of catalyst to an extent which could be avoided by utilizing the full cracking capacity of the catalyst. Since the reactor is a relatively simple and inexpensive vessel as compared to the complicated kiln and the facilities required for transport of hot catalyst between the two vessels, it is surprising to find that the added expense is more than repaid by incomplete use of the composite catalyst in the working side of the cycle.

It would appear that, although the active alumino-silicate characteristically produces less coke in relation to gasoline production than does the matrix, the former reaches a point of "coke saturation" at which it becomes inactive while the matrix may still retain a significant activity level. At this point, if not before, the composite catalyst should be purged of reactants and transferred to the regenerator for removal of coke by burning.

The new composite catalysts with which this invention is concerned is a superactive catalyst distributed throughout the pores of a diluting matrix. The proportion of the matrix in the composite can be varied from 10–99 weight percent of the composite, thus utilizing from 1–90 weight percent of the superactive catalyst. A preferred range of proportions is from 25–97 weight percent matrix and 3–75 weight percent of the superactive catalyst. In one application for use with existing plant facilities, a composite catalyst has been used in which the matrix is 96.5 weight percent and the active component only 3.5 weight percent of the composite.

Among the matrix materials which may be used as composite catalyst diluents are the hydrous oxide type, such as, silica-alumina complexes of various degrees of activity, silica-magnesia, silica gel, clay, alumina, and the like.

Generally, the superactive catalysts with which this invention is concerned are basically alumino-silicates of ordered internal structure. These materials are possessed of very high surface per gram, and are microporous. The ordered structure gives rise to a definite pore size, related to the structural nature of the ordered internal structure.

Several forms are commercially available. A 5 A. material indicates a material of A structure and a pore size of about 5 A. diameter. A 13X material is one of X structure and 10–13 A. pore diameter, and so on. There are also known materials of Y structure, and others. Many of these materials may be converted to the "H" or acid form, wherein a hydrogen occupies the cation site. For example, such a conversion may be had by ion-exchange with an ammonium ion, followed by heating to drive off $NH_3$ or by controlled acid leaching. In general, the H form is more stable in materials having higher Si/Al ratios, such as 2.5/1 and above.

One material of high activity is H mordenite. Mordenite is a material occurring naturally as the hydrated sodium salt corresponding to:

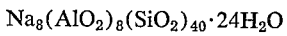

$$Na_8(AlO_2)_8(SiO_2)_{40} \cdot 24H_2O$$

This mordenite material may be leached with dilute hydrochloric acid to arrive at an H or acid form. In a specific example, the mordenite material may be so treated as to have more than 50% in the acid form.

Another type of high activity catalyst may be prepared by using Linde 13X molecular sieve, which is described in U.S. Patent 2,882,244. This material may be base exchanged with a solution of rare-earth chlorides (containing 4% of $RECl_3 \cdot 6H_2O$) at 180–200° F. to remove sodium ions from the alumino-silicate complex and replace at least some of them with the chemical equivalent of rare earth ions. After washing free of soluble material and drying, there is produced an REX alumino-silicate containing 1.0–5% (wt.) of sodium and about 25% (wt.) of rare earth ions calculated as $RE_2O_3$.

Similar preparations of high activity may be made by suitable preparation of a variety of naturally occurring crystalline alumino-silicates, such as Y-zeolites, L-zeolites, gmelinite, chabazite, dachiardite, clinoptilolite, faujasite, heulandite, and the like, which are capable of sorbing hydrocarbons above $C_3$. Preferred materials are those prepared from X, Y, and faujasite type in general, and from L-zeolites.

According to the invention, the alumino-silicate active component of the composite may be varied within wide limits as to alumino-silicate employed, cation character and concentration, and added components in the pores thereof incorporated by precipitation, adsorption and the like. Particularly important variables are silica to alumina ratio, pore diameter and spatial arrangement of cations. The cations may be protons (acid) derived by base exchange with solutions of acids or ammonium salts, the ammonium ion decomposing on heating to leave a proton. Polyvalent metals may be supplied as cations, as such or as spacing agents in acid alumino-silicates for stabilization.

The catalytic activity of the matrix materials and of prior catalysts may be measured by the "Cat A" activity test as described in National Petroleum News, 36, page R–537, August 2, 1944. In this test, a specified light East Texas gas oil is cracked by passage over the catalyst in a fixed bed, at a liquid hourly space velocity of 1.0, using a catalyst-to-oil ratio of 4/1 at an average reactor temperature of 875° F., and atmospheric pressure. The percentage of gasoline produced is the activity index (A.I.). The percentage of coke produced is also measured.

The superactive catalysts used in the present invention possess activities too great to be measured by the "Cat A" test discussed above. To measure their activity there has been developed a micro test method in which these catalysts are compared for relative cracking activity in the cracking of hexane with a conventional catalyst. This method and a fuller discussion of the development of the activity is fully disclosed in application Serial No. 208,512, filed July 9, 1962. As there explained alpha is the measure of the comparative conversion ability of a particular superactive catalyst of the type above discussed when compared with a conventional silica alumina cracking catalyst (90% SiO$_2$–10% AlO$_2$) having an activity index as measured by the Cat A test of 46. The alpha value of the conventional amorphous silica-alumina cracking catalyst is 1.

As a specific example, a crystalline alumino-silicate material having an activity of $\alpha \approx 10{,}000$ is first steamed at 1300° F. for 40 hours to reduce its activity to $\alpha \approx 10$. This material is then incorporated in a matrix of hydrogel in the manner of Patent No. 2,964,481, the hydrogel being a silica-alumina hydrogel, to arrive at beads containing 3.5 parts by weight of superactive material to 96.5 parts by weight of matrix. The activity of this resulting catalyst is $\alpha \approx 1.5$.

The superactive portion of the composite catalyst has a product selectivity in the cracking of hydrocarbons which gives additional yields of gasoline over that obtained with prior known catalysts, while giving less coke formation. The matrix portion of the composite catalyst has a product selectivity which is much less than the superactive portion and the resulting coke formation is much greater.

The composite catalyst described herein may be used in catalytic cracking operations such as a compact moving bed or in a fluidized operation. The general operating conditions cover a wide range. Thus, temperatures may vary over an approximate range of 550–1100° F., preferably 700–950° F. under pressures ranging from subatmospheric pressure up to several hundred atmospheres. Other parameters of cracking operations are space velocity and catalyst to oil ratio. These may be expressed upon either a volume or a weight basis. Upon a volume basis LHSV, is defined as cubic feet of liquid oil at 60° F. charged per hour per cubic foot of reactor occupied by catalyst. Catalyst to oil ratio upon a volume basis is the cubic feet of catalyst charged to the reactor per hour divided by the cubic feet of oil (60° F.) charged to the reactor per hour. Volume basis ratios are normally used in speaking of moving bed operations while weight basis ratios are more appropriate for fluidized operations. Conversion from one basis to another may be made readily. For a moving bed operation with catalytic materials of the type spoken of above with a relatively inert matrix and a total activity of the composite catalyst in the range of 1.5 to 10 LHSV conditions may range from about 0.2 to about 4.0 and upwards while catalyst oil ratios may range from about 1 to about 8 and upwards.

In accordance with the present invention, the cracking operation is so conducted as to avoid prolonging the time of reaction substantially beyond the point of "coke saturation" of the active component of the catalyst, having regard to the coking tendencies of the charge. Thus, it will be seen that time on stream can be prolonged before "coke saturation" of the active component of the catalyst by pretreating the charge hydrocarbons to reduce its tendency to form coke.

A mathematical relationship has been discovered to determine $T_{max}$, which is the time in minutes the catalyst is in contact with the charge hydrocarbons. This relationship is $$T_{max} < \frac{Rf}{SC_r}$$

wherein R is a constant based on the type of operation; $f$ is the weight fraction of superactive alumino-silicate in the composite catalyst; $C_r$ is the relative coking tendency of the charge hydrocarbons as determined by the Cat A test; and S is the space velocity in volume of charge per volume of catalyst per hour determined by the equation:

$$S = Bf\alpha_c$$

wherein $f$ has the meaning stated above; B is a numerical value not less than 2; and $\alpha_c$ is the relative activity of the superactive alumino-silicate.

Combining the two relationships, a final relationship is obtained:

$$T_{max} < \frac{R}{B} \times \frac{1}{\alpha_c \cdot C_r}$$

Thus, it is seen that the time of contact of the charge hydrocarbons with this type of catalyst varies inversely with the relative activity of the superactive aluminosilicate in the composite catalyst and the relative coking tendency of the charge hydrocarbons as determined by the Cat A test.

In the above, numerical values for $C_r$ may be gotten by dividing the amount of coke formed by the charged hydrocarbon under study in a Cat A test over an amorphous silica-alumina catalyst of $\alpha \approx 1$ or somewhat less (i.e., a conventional catalyst), by the amount of coke formed in the Cat A test by the gas oil charge specified for such test.

R is a numerical value, derived from experience, which varies somewhat with the type of operation, but which can be assigned a maximum value of $$R = 20C_p \text{ to } R = 30C_p$$

where $C_p$ is the permissible coke lay down upon catalyst. With present conventional catalysts and regeneration systems $C_p$ is of the order of 2, but with superactive catalysts and composites thereof, and with regeneration systems suited thereto, it may be higher, as noted herein.

B is a numerical value, not less than 2 and preferably 4 or greater.

Taking as an example a composite catalyst containing, in an inert matrix, 10 weight percent of a superactive material of $\alpha \approx 10$ upon which coke may be deposited to the extent of 15–20 weight percent of the superactive material.

Since $T_{max}$ is to be limited, we should take the lowest value for R, that is $$R = 20 \times 15 = 300$$

and a value for B in its upper range $$B = 4$$

Now, substituting $$T_{max} < \frac{300}{4} \times \frac{1}{10 X C_r}$$

Since, in this case we assume operation upon the standard gas oil specified for Cat A testing, $C_r$ becomes 1, then $$T_{max} < \frac{300}{4} \times \frac{1}{10 X 1} = \frac{300}{40} = 7\frac{1}{2}$$

$$T_{max} < 7\frac{1}{2} \text{ minutes}$$

The above tells that operation for about 7 minutes with the assumed catalyst and assumed gas oil will lay down about $$fC_p = \text{coke level}$$

or $10/100 \times 15 = 1.5$ wt. percent of coke on the catalyst. Since the regeneration system in the assumed setup is capable of handling this level of coke deposit with competence, the projected operation appears satisfactory. However, if the regeneration system were one incapable of reducing the residual coke below .5 wt. percent one would be sending to regeneration a catalyst with a coke level of 1.5+.5 or 2 weight percent, and one should consider adjustment of the total system with respect to the competence of the regeneration system at that coke level.

It is recognized that most matrix components of a composite catalyst may contribute and do in fact usually contribute to the total coke on catalyst. Their contribution can be handled in much the same way as indicated for coke on superactive material. If, in the example cited, the matrix, instead of being inert, was one which, with the charge, space velocity, and catalyst to oil ratio indicated by the basic calculations would accumulate 0.5% of its weight in coke, the calculation would be as follows:

Coke from superactive ingredients:

$$10/100 \times 15 = 1.5 \text{ wt. percent on composite}$$

Coke from matrix:

$$90/100 \times .5 = .45 \text{ wt. percent on composite}$$

Total coke on catalyst 1.95 wt. percent.

The process of the present invention also includes the preliminary treatment of the charge hydrocarbons so as to reduce its coking tendency. This coking tendency is defined as the ratio of coke produced by the stock in question to the coke production of the standard East Texas light gas oil defined in the Cat A procedure.

The limitations imposed by coking tendency of the charge can be overcome in part by first treating the charge to reduce that tendency, as by distillation to remove a heavy end cut, extraction with a solvent such as furfural, hydrogenation percolation or the like. One method of reducing the coking tendency of the charge is to pass the charge at the temperature of the cracking reactor through a guard chamber of catalytically inert but adsorbent material such as silica gel which is separately regenerated by burning.

In such combination processes wherein the charge is first treated to reduce its coking tendency prior to contact with the catalyst composite, the value of $C_r$ used in the above relationships is that corresponding to the pre-treated material as admitted to the cracking reactor.

It has been found that composite catalysts of the type described heretofore become "coke saturated" with respect to the superactive component when the amount of coke deposited amounts to 15–20 weight percent of the weight amount of superactive component present.

The criteria stated mathematically above apply directly to TCC style of operation wherein the catalyst is regenerated to a uniform level of reactivation in the kiln. Although the limits also apply to fluid style of cracking, it must be recognized that the residual carbon level maintained by most fluid units differs from that used in TCC operation and this should be taken into account. Thus, the time of catalyst in the reactor ($T_{max}$) should in such cases be further restricted to a period which will not carry reaction substantially past the point of alumino-silicate coke saturation having regard to coke content of the catalyst as returned from the kiln.

What is claimed is:

1. In a process for the fluid catalytic cracking of charge hydrocarbons by contact at fluid cracking conditions of temperature and pressure with a composite catalyst comprising a superactive aluminosilicate of activity $\alpha_c$ dispersed in a solid porous matrix of substantially lesser activity than said aluminosilicate, the superactive component constituting a fraction $f$ of the total catalyst, the improvement which comprises regulating the space velocity S in volume of charge per volume of catalyst per hour according to the formula $$S = Bf\alpha_c$$

where B is a numerical value not less than 2.0, and regulating the time $T_{max}$ in minutes of contact of catalyst with charge hydrocarbons to not exceed $$T_{max} < \frac{Rf}{SC_r}$$

where R is a numerical value not less than 300 and not greater than 600; and $C_r$ is the relative coking tendency of the charge hydrocarbons as determined by the Cat A test.

2. The process of claim 1 wherein the charge is first heated to the temperature of the cracking step and passed through a guard chamber containing catalytically inert but adsorbent material to reduce the relative coking tendency of the charge.

3. The process of claim 1 wherein the charge is first extracted with a solvent to reduce its relative coking tendency.

4. The process of claim 1 wherein the charge is first distilled to remove a heavy end cut thereby reducing the relative coking tendency of the charge.

References Cited by the Examiner

UNITED STATES PATENTS

| | | | |
|---|---|---|---|
| 2,246,959 | 6/1941 | Sweeney | 208—92 |
| 2,882,219 | 4/1959 | Johnson | 208—87 |
| 2,926,129 | 2/1960 | Kimberlin et al. | 208—87 |
| 2,955,080 | 10/1960 | Carter | 208—87 |
| 3,039,953 | 6/1962 | Eng | 208—120 |
| 3,140,251 | 7/1964 | Plank et al. | 208—120 |

DELBERT E. GANTZ, *Primary Examiner.*

ALPHONSO D. SULLIVAN, *Examiner.*

P. P. GARVIN, H. LEVINE, *Assistant Examiners.*